United States Patent
Sekiya et al.

(10) Patent No.: US 6,999,211 B2
(45) Date of Patent: Feb. 14, 2006

(54) ORIGINAL CONVEYING APPARATUS, LIGHT AMOUNT ADJUSTMENT METHOD FOR LIGHT-EMITTING SECTION THEREOF, IMAGE FORMING APPARATUS, CONTROL METHOD THEREFOR, STORAGE CONTROL DEVICE, STORAGE CONTROL METHOD, AND STORAGE MEDIUM

(75) Inventors: Takeshi Sekiya, Chiba (JP); Shigeru Sugita, Saitama (JP); Satoshi Choho, Tokyo (JP); Yoshiyuki Nakajima, Ibaraki (JP)

(73) Assignee: Canon Kabushiki Kaisha, (JP)

( * ) Notice: Subject to any disclaimer, the term of this patent is extended or adjusted under 35 U.S.C. 154(b) by 933 days.

(21) Appl. No.: 09/908,970

(22) Filed: Jul. 19, 2001

(65) Prior Publication Data

US 2002/0044308 A1    Apr. 18, 2002

(30) Foreign Application Priority Data

Jul. 19, 2000    (JP) .............................. 2000-218992

(51) Int. Cl.
*H04N 1/04* (2006.01)
*H04N 1/00* (2006.01)
*H04N 1/32* (2006.01)
*H04N 1/40* (2006.01)
*G04N 15/00* (2006.01)

(52) U.S. Cl. ...................... 358/498; 358/475; 358/488; 358/444; 358/404; 358/465; 399/367; 399/371; 399/9; 399/16; 399/17

(58) Field of Classification Search ................ 358/475, 358/474, 406, 504, 509, 505, 404, 444, 486, 358/488, 401, 496, 498, 466, 465; 399/32, 399/31, 10, 11, 9, 376, 367, 371, 370, 16, 399/17; 348/96, 97; 355/40, 41, 408, 407, 355/401, 402
See application file for complete search history.

(56) References Cited

U.S. PATENT DOCUMENTS 6,134,496 A * 10/2000 Rotter et al. .................. 701/56
6,330,083 B1 * 12/2001 Nabeshima et al. ........ 358/474
6,445,984 B1 * 9/2002 Kellogg ....................... 701/23

\* cited by examiner

*Primary Examiner*—Cheukfan Lee
(74) *Attorney, Agent, or Firm*—Rossi, Kimms & McDowell, LLP

(57) ABSTRACT

There is provided an original conveying apparatus for conveying an original to an image reading section of an image forming apparatus, which is capable of preventing the number of times of writing to a nonvolatile storage medium that stores a correction value for the light emission amount of an optical sensor from exceeding a limited number of times even when adjustment of the light emission amount of the optical sensor is carried out frequently, reducing as far as possible the number of times of writing data to the storage medium that can store such data a limited number of times, thereby eliminating the occurrence of inconvenient situations such as it being impossible to maintain proper output processing, and lengthening the lifetime of the storage medium. Writing of the correction value for the light amount of the light-emitting section of the optical sensor to an EEPROM is carried out if the correction value has changed by at least a predetermined amount relative to the value before adjustment but is not carried out if the correction value has not changed by at least this predetermined amount relative to the value before adjustment.

20 Claims, 8 Drawing Sheets

ORIGINAL CONVEYING APPARATUS, LIGHT AMOUNT ADJUSTMENT METHOD FOR LIGHT-EMITTING SECTION THEREOF, IMAGE FORMING APPARATUS, CONTROL METHOD THEREFOR, STORAGE CONTROL DEVICE, STORAGE CONTROL METHOD, AND STORAGE MEDIUM

BACKGROUND OF THE INVENTION

1. Field of the Invention

The present invention relates to an original conveying apparatus, a light amount adjustment method for a light-emitting section thereof, an image forming apparatus, a control method therefor, a storage control device, a storage control method, and a storage medium. In particular, the present invention relates to an original conveying apparatus of an image forming apparatus such as a copier or a laser beam printer that conveys originals to an image reading section of the image forming apparatus, a light amount adjustment method for a light-emitting section of the original conveying apparatus, the image forming apparatus, a control method for the image forming apparatus, a storage control device, a storage control method, and a storage medium storing a program for implementing the storage control method.

2. Description of the Related Art

Conventionally, an ADF(Auto document feeder) or the like is used as an original conveying apparatus of an image forming apparatus such as a copier or a laser beam printer, in which originals are separated sheet by sheet from a stack of originals set in an original tray, the separated original being conveyed to an image reading section of the image forming apparatus, where image formation is carried out, and then the separated originals are discharged from the original conveying apparatus into a discharge tray. To carry out this operation, the original conveying apparatus is provided with a large number of sensors which sense the position of an original currently being conveyed, and whether or not there are still originals set in the original tray. Moreover, a large number of sensors including ones for detecting recording sheets are also provided on the main body side of the image forming apparatus. Known types of such sensors include flag type sensors, and optical sensors that are comprised of a light-emitting section and a light-receiving section.

In the case of an optical sensor, the amount of light from the light-emitting section may drop due to variations between sensor elements or the lifetime being reached, and thus to maintain the performance of the sensor it is necessary to carry out adjustments. An EEPROM or the like is used as a storage medium for storing adjustment values even when the power supply is off.

However, in the case of a conventional apparatus such as an original conveying apparatus or an image forming apparatus having one or more optical sensors as described above, problems such as the following can be envisaged.

The light-emitting element (generally an LED) used in the light-emitting section of an optical sensor has a lifetime, and the amount of light emitted drops due to aging. Moreover, if there is paper dust, dirt or the like on the surface of a sensor element, then there will be a drop in the amount of light reaching the light-receiving section. To maintain the performance of an optical sensor over a prolonged period of time, it is thus necessary to adjust the amount of light emitted at regular time intervals.

The correction value of the light emission amount of an optical sensor when this light emission amount has been adjusted is written into a nonvolatile storage medium such as an EEPROM so as to be kept even after the power supply has been turned off, but there is a limit on the number of times that such a nonvolatile storage medium can be written. Thus, if writing is carried out frequently, then there is a chance that this limit may be reached before the lifetime of the device is reached.

It is thus desirable to reduce as far as possible the number of times that data is written to such a storage medium that is capable of storing data such as correction values used in correction (adjustment) processing for maintaining proper output processing but for which the number of times that data can be written is limited, thus lengthening the lifetime of the storage medium and eliminating the occurrence of inconvenient situations such as it being impossible to maintain proper output processing.

SUMMARY OF THE INVENTION

It is an object of the present invention to provide an original conveying apparatus, a light amount adjustment method for a light-emitting section thereof, an image forming apparatus, a control method therefor, a storage control device, and a storage control method, which have overcome the above problems, and a storage medium storing a program for implementing the storage control method.

It is a further object of the present invention to provide an original conveying apparatus, a light amount adjustment method for a light-emitting section thereof, an image forming apparatus, a control method therefor, a storage control device, and a storage control method, which, even if processing for maintaining proper output processing such as adjustment of the light emission amount of an optical sensor is carried out frequently, are capable of preventing the number of times of writing data, such as a correction value for the light emission amount of the optical sensor, to a storage medium such as a nonvolatile storage medium that can store such data a limited number of times, from exceeding the limited number of times, and are capable of reducing as far as possible the number of times of writing data to the storage medium that can store such data a limited number of times, thereby eliminating the occurrence of inconvenient situations such as it being impossible to maintain proper output processing, and lengthening the lifetime of the storage medium, and a storage medium storing a program for implementing the storage control method.

To attain the above objects, a first aspect of the present invention provides an original conveying apparatus comprising conveying means for conveying an original to an image reading section of an image forming apparatus, original detecting means comprising a light-emitting section that irradiates light onto the conveyed original, and a light-receiving section that receives light reflected from the original, adjustment means for adjusting a light amount from the light-emitting section, volatile storage means which permits electrical writing and erasure, for storing a correction value of the light amount adjusted by the adjustment means, nonvolatile storage means which permits electrical writing and erasure, for storing the correction value, and writing means for carrying out writing of the correction value only to the volatile storage means and not to the nonvolatile storage means when the correction value has not changed by at least a predetermined amount relative to a correction value before adjustment by the adjustment means.

Preferably, adjustment of the light amount from the light-emitting section by the adjustment means is carried out immediately after a power supply to the original conveying apparatus has been turned on and after a predetermined time period has passed after the original conveying apparatus has moved into a standby mode.

In a typical preferred embodiment of the first aspect, the volatile storage means comprises a RAM, and the nonvolatile storage means comprises an EEPROM.

To attain the above objects, the first aspect of the present invention also provides an image forming apparatus having an original conveying apparatus according to the first aspect as constructed above, for forming an image on a recording sheet based on an image on the original.

To attain the above objects, the first aspect of the present invention further provides a method of adjusting a light amount of a light-emitting section of an original conveying apparatus comprising conveying means for conveying an original to an image reading section of an image forming apparatus, original detecting means comprising a light-emitting section that irradiates light onto the conveyed original, and a light-receiving section that receives light reflected from the original, adjustment means for adjusting a light amount from the light-emitting section, volatile storage means which permits electrical writing and erasure, for storing a correction value of the light amount adjusted by the adjustment means, and nonvolatile storage means which permits electrical writing and erasure, for storing the correction value, the method comprising the step of carrying out writing of the correction value only to the volatile storage means and not to the nonvolatile storage means when the correction value has not changed by at least a predetermined amount relative to a correction value before adjustment by the adjustment means.

To attain the above objects, a second aspect of the present invention provides a storage control device for controlling writing data relating to a correction value of a light amount from a light-emitting section of an image forming apparatus to a volatile first storage device and a nonvolatile second storage device of the image forming apparatus wherein the light amount has been adjusted by adjustment means of the image forming apparatus, the storage control device comprising storage control means for inhibiting writing to the second storage device of the data relating to the correction value adjusted by the adjustment means as a result of adjustment of the light amount from the light-emitting section carried out by the adjustment means, when the data relating to the correction value adjusted by the adjustment means has not changed by at least a predetermined amount relative to data relating to a correction value already stored in the second storage device.

Preferably, the storage control means permits writing to the first storage device of the data relating to the correction value adjusted by the adjustment means each time adjustment of the light amount from the light-emitting section is carried out by the adjustment means.

Preferably, the storage control means includes comparing means being responsive to adjustment of the light amount from the light-emitting section having been carried out by the adjustment means, for comparing the data relating to the correction value that has been adjusted by the adjustment means and written to the first storage device with the data relating to the correction value already written to the second storage device, and wherein the storage control means determines whether or not to inhibit writing to the second storage device of the data relating to the correction value adjusted by the adjustment means based on a comparison result from the comparing means.

More preferably, the storage control means is responsive to a determination from the comparison result by the comparing means that the data relating to the correction value that has been adjusted by the adjustment means and written to the first storage device has changed by at least the predetermined amount relative to the data relating to the correction value already written to the second storage device, for permitting writing to the second storage device of the data relating to the correction value adjusted by the adjustment means.

In a typical preferred embodiment of the second aspect, the image forming apparatus includes an original conveying apparatus, and a sensor for detecting an original provided in the original conveying apparatus, the sensor having the light-emitting section, and wherein the adjustment means adjusts a light amount from the light-emitting section of the sensor.

Preferably, adjustment of the light amount from the light-emitting section by the adjustment means is carried out immediately after a power supply to the original conveying apparatus has been turned on and after a predetermined time period has passed after the original conveying apparatus moved into a standby mode.

In another preferred embodiment of the second aspect, the image forming apparatus includes an image forming section main body, and a sensor for detecting a sheet provided in the image forming section main body, the sensor having the light-emitting section, and wherein the adjustment means adjusts a light amount from the light-emitting section of the sensor.

Preferably, adjustment of the light amount from the light-emitting section by the adjustment means is carried out immediately after a power supply to the image forming section main body has been turned on and after a predetermined time period has passed after the image forming section main body moved into a standby mode.

In a further preferred embodiment of the second aspect, the image forming apparatus includes a sheet processing device, and a sensor for detecting a sheet provided in the sheet processing device, the sensor having the light-emitting section, and wherein the adjustment means adjusts a light amount from the light-emitting section of the sensor.

Preferably, adjustment of the light amount from the light-emitting section by the adjustment means is carried out immediately after a power supply to the sheet processing device has been turned on and after a predetermined time period has passed after the sheet processing device moved into a standby mode.

Preferably, the first storage device includes a RAM, and the second storage device includes an EEPROM.

To attain the above objects, the second aspect of the present invention also provides a storage control method of controlling writing data relating to a correction value of a light amount from a light-emitting section of an image forming apparatus to a volatile first storage device and a nonvolatile second storage device of the image forming apparatus wherein the light amount has been adjusted by adjustment means of the image forming apparatus, the storage control method comprising a storage control step of inhibiting writing to the second storage device of the data relating to the correction value adjusted by the adjustment means as a result of adjustment of the light amount from the light-emitting section carried out by the adjustment means, when the data relating to the correction value adjusted by the adjustment means has not changed by at least a predetermined amount relative to data relating to a correction value already stored in the second storage device.

To attain the above objects, the second aspect of the present invention further provides a computer-readable storage medium storing a program for causing a storage control device that controls writing data relating to a correction value of a light amount from a light-emitting section of an image forming apparatus to a volatile first storage device and a nonvolatile second storage device of the image forming apparatus wherein the light amount has been adjusted by adjustment means of the image forming apparatus, to execute a storage control step of inhibiting writing to the second storage device of the data relating to the correction value adjusted by the adjustment means as a result of adjustment of the light amount from the light-emitting section carried out by the adjustment means, when the data relating to the correction value adjusted by the adjustment means has not changed by at least a predetermined amount relative to data relating to a correction value already stored in the second storage device.

To attain the above objects, a third aspect of the present invention provides a storage control device for controlling a writing process of writing data relating to a correction value corrected by correcting means of an image forming apparatus to a storage device, the storage control device comprising control means operable when correction of the correction value by the correcting means is performed, for inhibiting writing the data relating to the correction value corrected by the correcting means to the storage device if a difference between the correction value corrected by the correcting means and a correction value registered by data already stored in the storage device is smaller than a predetermined value, and for allowing writing the data relating to the correction value corrected by the correcting means to the storage device if the difference between the correction value corrected by the correcting means and the correction value registered by the data already stored in the storage device exceeds the predetermined value.

To attain the above objects, the third aspect of the present invention also provides a storage control method for controlling a writing process of writing data relating to a correction value corrected by correcting means of an image forming apparatus to a storage device, the storage control method comprising a control step of inhibiting writing the data relating to the correction value corrected by the correcting means to the storage device if a difference between the correction value corrected by the correcting means and a correction value registered by data already stored in the storage device is smaller than a predetermined value, and for allowing writing the data relating to the correction value corrected by the correcting means to the storage device if the difference between the correction value corrected by the correcting means and the correction value registered by the data already stored in the storage device exceeds the predetermined value, when correction of the correction value by the correcting means is performed.

The above and other objects, features and advantages of the invention will become more apparent from the following detailed description taken in conjunction with the accompanying drawings.

DETAILED DESCRIPTION OF PREFERRED EMBODIMENTS

A whole system including an original conveying apparatus and an image forming apparatus according to an embodiment of the present invention will now be described with reference to the drawings.

Figure 1:
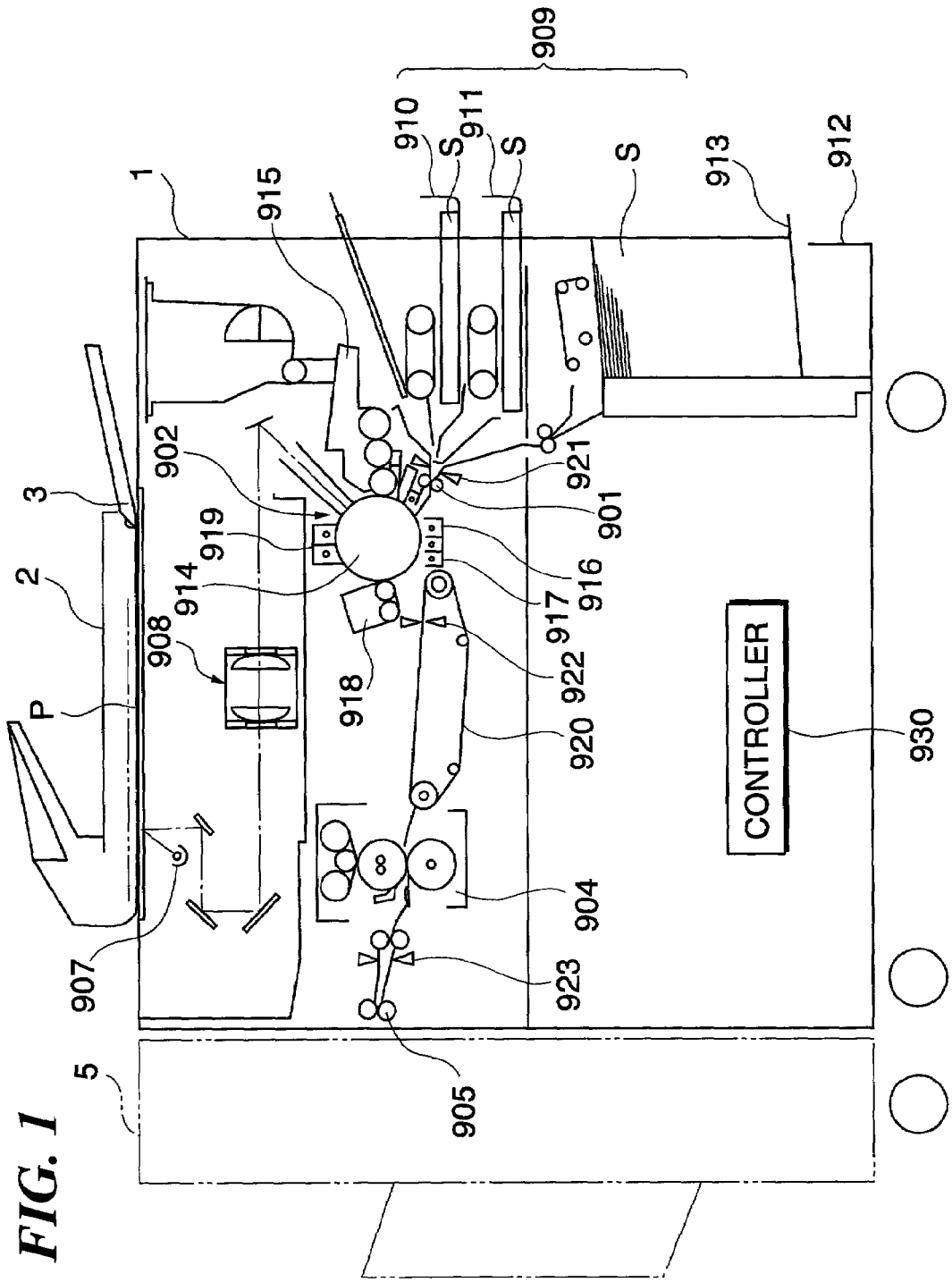
FIG. 1 is a schematic view showing the constitution of an image forming apparatus to which an original conveying apparatus according to an embodiment of the present invention is applied.

FIG. 1 is a schematic view showing the constitution of an image forming apparatus to which an original conveying apparatus according to an embodiment of the present invention is applied.

Figure 2:
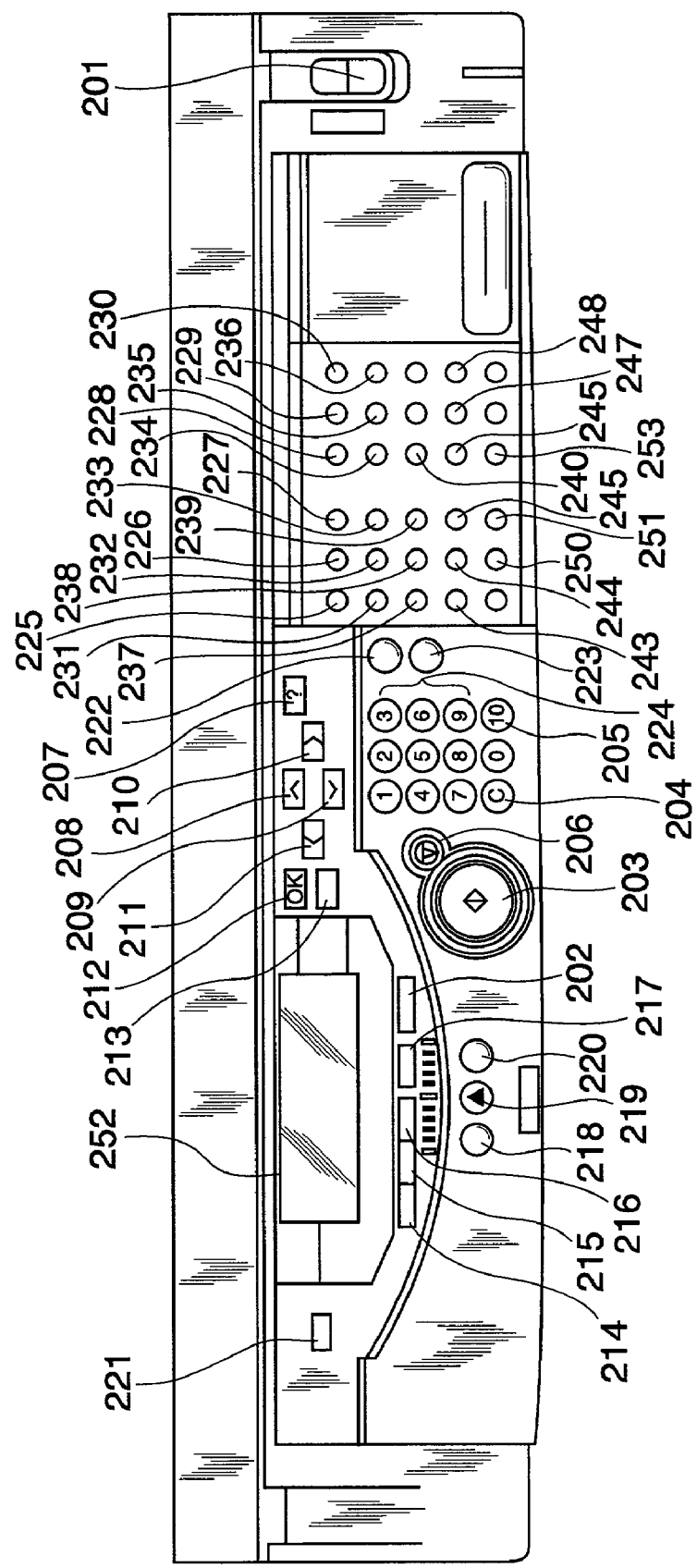
FIG. 2 is a view showing an example of the layout of an operating section of a copier main body 1 appearing in FIG. 1.

In FIG. 1, a main body 1 of a copier (hereinafter referred to as "the copier main body 1") as an image forming apparatus has a platen glass 3 as a table on which an original P is placed, a light source 907, a lens system 908, a sheet feeding section 909, an image forming section 902, an original conveying apparatus 2 that feeds the original P onto the platen glass 3, and a sheet processing apparatus 5 capable of carrying out sheet processing such as piling up, sorting and binding recording sheets S that have had an image formed thereon and have been discharged from the copier main body 1. Moreover, the copier main body 1 has an operating section on top as shown in FIG. 2, described below, and a controller 930 that carries out overall control of the system that includes the original conveying apparatus 2, the sheet processing apparatus 5, and the like.

The sheet feeding section 909 has cassettes 910, 911 that house the recording sheets S and can be freely attached into and detached from the copier main body 1, and a deck 913 placed on a pedestal 912. The image forming section 902 has therein a cylindrical photosensitive drum 914, and a developing device 915, an image transfer charging device 916, a separation charging device 917, a cleaner 918 and a primary charging device 919, which are arranged around the photosensitive drum 914. A conveying device 920, a fixing device 904 and a pair of discharge rollers 905 are arranged on the downstream side of the image forming section 902.

Moreover, a plurality of sensors are provided along the path along which the recording sheets S are conveyed inside the copier main body 1. For example, a fed sheet sensor 921 is an optical sensor for detecting sheets fed from the sheet feeding section 909; a post-transfer sensor 922 is an optical sensor for detecting sheets that have had an image transferred thereupon and are being conveyed by the conveying device 920; a discharged sheet sensor 923 is an optical sensor for detecting sheets to which the transferred image thereupon has been fixed by the fixing device 904.

Moreover, a plurality of sensors, not shown, similar to those described above are also provided in the sheet processing apparatus 5 capable of carrying out sheet processing such as piling up, sorting and binding of sheets discharged from the copier main body 1, for example along the path along which the sheets are conveyed and in a sheet storage tray. For example, one or more optical sensors for detecting sheets are provided along the sheet conveyance path from the copier main body 1 to the sheet storage tray, and one or more optical sensors for detecting the presence/absence of sheets are provided in the sheet storage tray (these sensors not shown).

The constitution itself of the various sensors described above is the same as that of the sensors in the original conveying apparatus, described below, and therefore description of this constitution is omitted here. Moreover, in the present embodiment, a light amount adjustment process, described below using the flowchart in FIG. 8, can be carried out on each of these sensors individually using the controller 930.

A description will now be given of the operation of the copier main body 1.

A sheet S is fed from one of the cassettes 910, 911 or from the deck 913 in response to a feed sheet signal outputted from the controller 930. Light is irradiated from the light source 907 onto an original P placed on the platen glass 3, and light reflected from the original P passes through the lens system 908 and falls upon the photosensitive drum 914. This light causes an electrostatic latent image to be formed on a charged portion of the photosensitive drum 914 that has been produced in advance using the primary charging device 919, and this electrostatic latent image is then developed by the developing device 915 to form a toner image.

The presence of the sheet S that has been fed from the sheet feeding section 909 is detected by the fed sheet sensor 921, and then any skew of the sheet is corrected by a resist roller 901 and the sheet is fed into the image forming section 902 with matching timing (this timing is determined based on the detection results from the fed sheet sensor 921). In the image forming section 902, the toner image on the photosensitive drum 914 is transferred by the image transfer charging device 916 onto the sheet S that has been fed in, and then the sheet S onto which the toner image has been transferred is charged by the separation charging device 917 to a polarity opposite to that given by the image transfer charging device 916, and thus separated from the photosensitive drum 914.

The presence of the separated sheet S is then detected by the post-transfer sensor 922 attached to the conveying device 920, the sheet S is conveyed by the conveying device 920 to the fixing device 904, and the transferred image is permanently fixed onto the sheet S by the fixing device 904. Once the image has been fixed, the sheet S is discharged from the copier main body 1 by the pair of discharge rollers 905, passing the discharged sheet sensor 923.

During this sequence of image formation steps, the controller 930 checks on the current location of the sheet using sensors as described above. Based on the sheet detection results from the sensors, the size of the sheet (the length in the direction of conveyance) and the existence of problems such as defective conveyance or a sheet jam can be detected.

FIG. 2 is a view showing the operating section of the copier main body 1 shown in FIG. 1.

In FIG. 2, the operating section has keys having functions as follows. A power supply switch 201 is used to control the supply of electric power to the copier main body 1. A reset key 202 is used to return to a standard mode from a scanning mode during standby. A copy start key 203 is used to start a copying operation. A clear key 204 is used to clear numerical entries. An ID key 205 is used for allowing only certain specific users to carry out copying; copying is prohibited unless an ID is inputted using the ID key 205. A stop key 206 is used to interrupt or stop copying. A guide key 207 is used when the user wishes to know details about the various functions. An up cursor key 208 is used to move a pointer on a function setting screen up; a down cursor key 209 is used to move the pointer down; a right cursor key 210 is used to move the pointer to the right; a left cursor key 211 is used to move the pointer to the left. An OK key 212 is pressed to accept a setting on a function setting screen. An execute key 213 is used to execute a function displayed on a function setting screen at the bottom right of a display screen, described below.

A regular size reduction key 214 is used when reducing from one regular size to another regular size. A 100% magnification copy key 215 is used when copying with no enlargement/reduction. A regular size enlargement key 216 is used when enlarging from one regular size to another regular size. A cassette selection key 217 is used to select a cassette from which the recording sheet is taken when copying. A copy density adjustment key 218 is used to adjust the copy density to a lighter density. An AE key 219 is used to automatically adjust the copy density relative to the density of the original. A copy density adjustment key 220 is used to adjust the copy density to a darker density. A sorter operation designation key 221 is used for designating sorter operations relating to sorting, position/number of staples, hole punching and the like. A preheat key 222 is used to turn a preheat mode on and off. An interrupt key 223 is used to interrupt the copying currently in progress so that one may cut in and carry out other copying. Ten keys 224 are used for entering numerical values.

A marker processing key 225 is used to set trimming and masking (outlining, hatching, shadowing, negative/positive inversion). A patterning key 226 is used to express colors with patterning or as differences in density. A color processing key 227 is used to eliminate a particular color. An image quality key 228 is used to set the image quality. A negative/positive key 229 is used to carry out negative/positive inversion. An image create key 230 is used to carry out outlining, shadowing, hatching, slanting, mirroring and repeating. A trimming key 231 is used to designate an area and carry out trimming. A masking key 232 is used to designate an area and carry out masking. A partial processing key 233 is used to designate an area so that processing (outlining, hatching, shadowing, negative/positive inversion) can be carried out on only this area. A frame erase key 234 is used to carry out frame erasure in accordance with frame erase modes. The modes include sheet frame erase (a frame is created in accordance with the size of the recording sheet), original frame erase (a frame is created in accordance with the size of the original, which is designated), and book frame erase (a blank area with a frame in the middle is created in accordance with the spread size of a book, which is designated).

A binding margin key 235 is used to create a binding margin at one edge of the recording sheet. A shift key 236 is used when shifting. Types of shift include a parallel shift (up/down/left/right), a center shift, a corner shift, and a designated shift (a point is designated). A zoom key 237 allows the copy magnification to be set to any value from 25 to 400% with 1% increments. The copy magnification can be set independently for a main scanning direction and an auxiliary scanning direction.

An auto variable power key 238 is used to make the magnification be changed automatically in accordance with the size of the recording sheet. The variable powering can be set independently for the main scanning direction and the auxiliary scanning direction. An enlarged serial copy key 239 is used to enlarge a single original and then copy onto a plurality of sheets. A reduced layout key 240 is used to enlarge/reduce a plurality of originals and then copy onto a single sheet.

A duplex copy key 243 is used to divide the copying region on the platen glass into a left side and a right side and then automatically carry out two copies in succession (duplex/duplex copy, two-sided duplex copy). A two-side key 244 is used to carry out two-sided output (one-sided/two-sided, page duplex copy two-sided, two-sided/two-sided). A multiplex key 245 is used to carry out multiplexing (multiplex, duplex/duplex copy multiplex). A memory key 246 is used to implement a mode that uses a memory (memory composition, area composition, watermark composition). A project key 247 is used to set a printing time. A mixed original key 250 is used when there are originals of different sizes when copying using a feeder. A mode memory key 251 is used to register a copy mode which has been set for copying, or to call up a previously registered copy mode. A display screen 252 displays the state of the copier, the number of copies, the copy magnification, and the recording sheet size, and during copy mode setting, displays the mode to be set.

Figure 3:
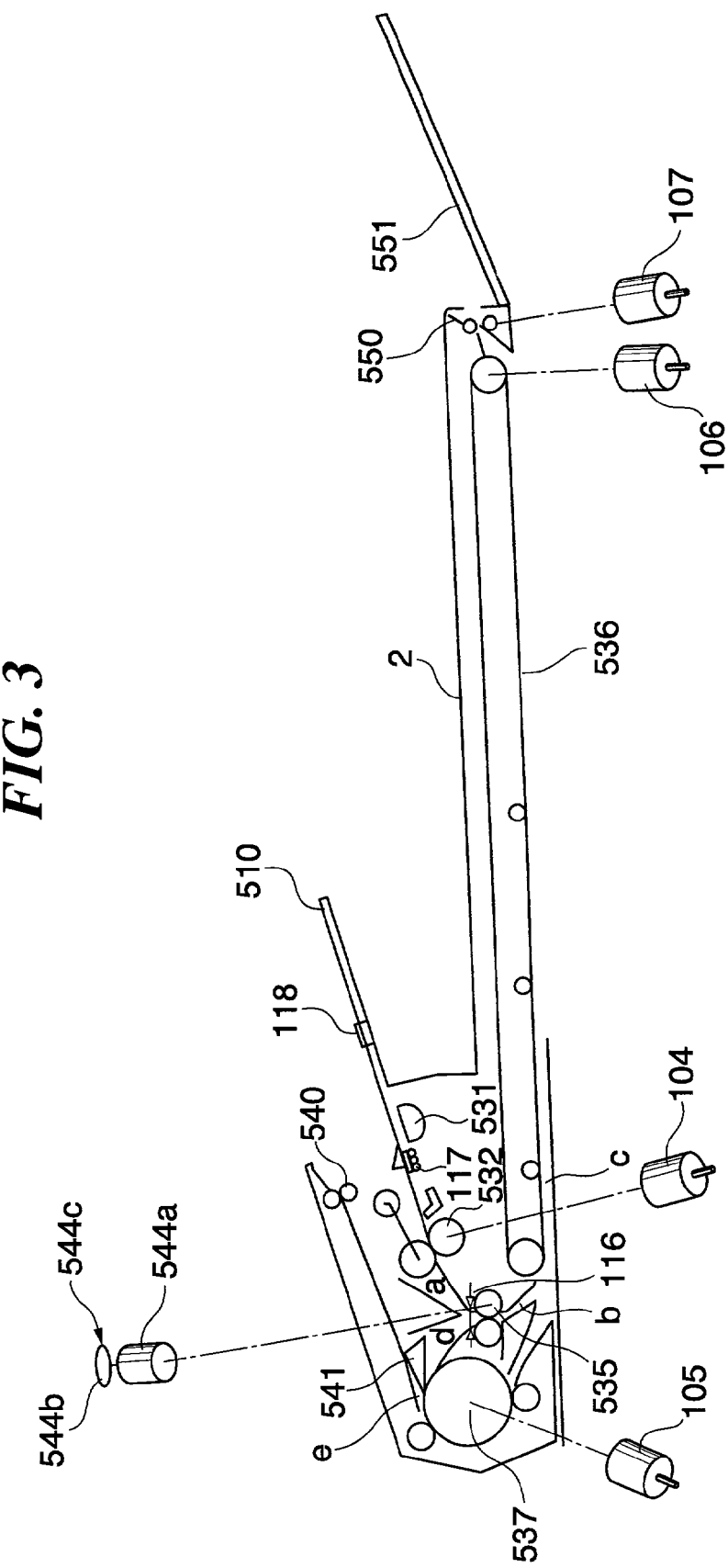
FIG. 3 is a side view of the original conveying apparatus according to the embodiment.

FIG. 3 is a side view of an original conveying apparatus according to an embodiment of the present invention.

In FIG. 3, a loading tray 510 upon which a stack of originals is set is provided at one end of an ADF 2 as the original conveying apparatus. Moreover, the loading tray 510 is provided with a feeding means that feeds the originals. This feeding means is composed of a half-moon roller 531, a separating conveying roller 532, a separating conveying motor 104 that rotates the separating conveying roller 532, a resist roller 535, a resist roller motor 544a that rotates the resist roller 535, a disk 544b with a scale attached to a rotating shaft of the resist roller motor 544a, a motor clock sensor 544c that reads the scale on the disk 544b, a full surface belt 536, a belt motor 106, a large conveying roller 537, a conveying motor 105 that rotates the large conveying roller 537 (FIG. 4), a flapper 541, and various sensors. The sensors include the resist sensor 116, an original detecting sensor 117, and a pre-cycle-end sensor 118, and also sensors that are not shown in FIG. 3 but will be described in detail with reference to FIG. 4, namely a separation sensor 109, an inversion entrance sensor 111, and an inversion exit sensor 119.

Figure 4:
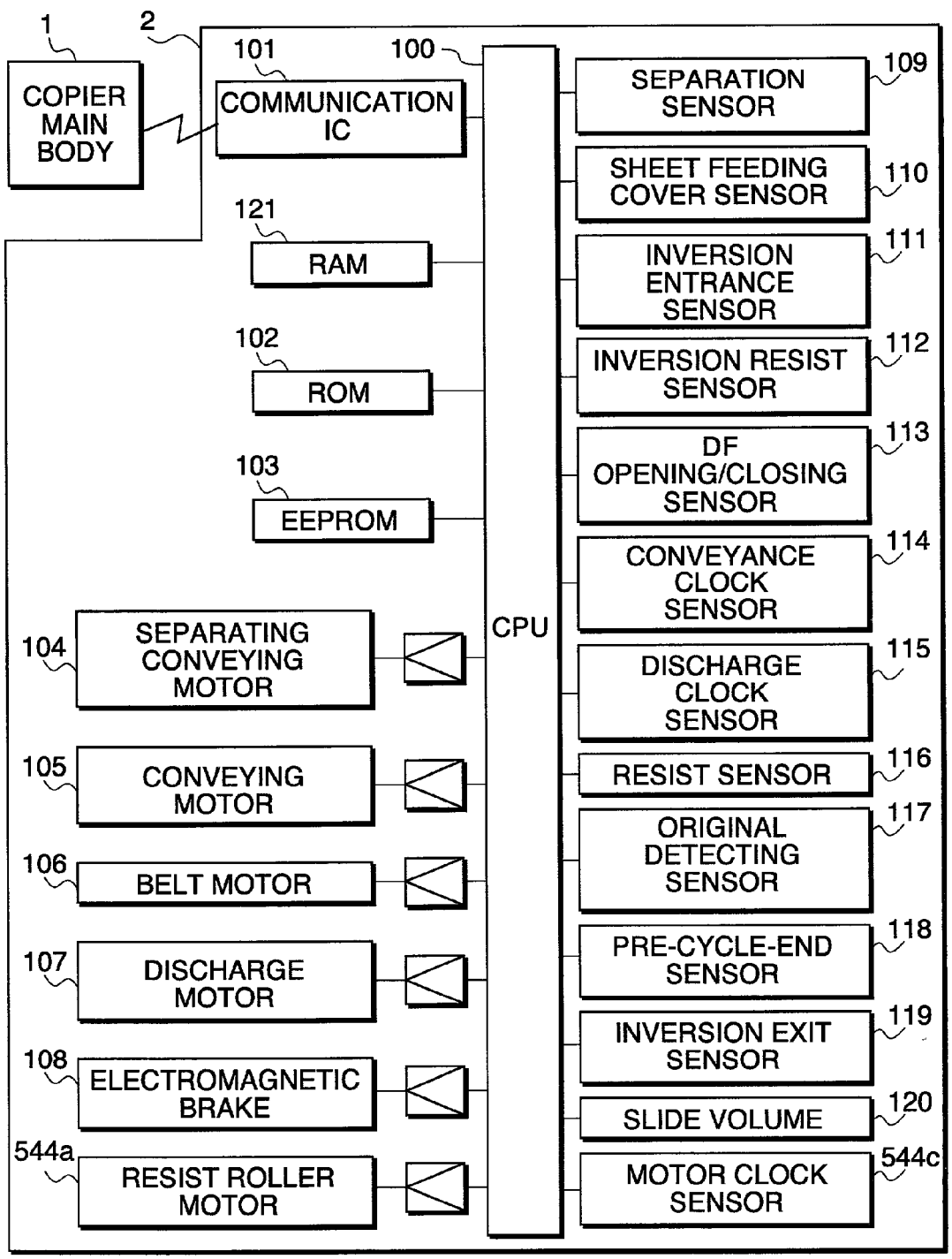
FIG. 4 is a block diagram showing the circuit configuration of ADF 2 in the image forming apparatus shown in FIG. 1.

At the other end of the ADF 2, there is a discharging means that discharges and piles up read originals. This discharging means is composed of a discharge roller 550, a discharge motor 107, a discharge tray 551, and a discharge clock sensor 115 (FIG. 4).

The half-moon roller 531 and the separating conveying roller 532 are rotated by means of the separating conveying motor 104, to separate the originals one at a time from the bottom of the stack of originals on the loading tray 510. The resist roller 535 and the full surface belt 536 (conveying means) are rotated by means of the belt motor 106 (conveying means), to convey the separated original P along sheet paths a, b as far as an image reading section on the platen glass 3 (sheet path c).

As modes for discharging the original P after the image reading has been completed, there are a first discharge mode in which the original P is discharged onto the loading tray 510, and a second discharge mode in which the original P is discharged onto the discharge tray 551.

In the first discharge mode, the large conveying roller 537 is first rotated by means of the conveying motor 105, thus conveying the original P on the platen glass 3 from a sheet path c to a sheet path e, after which the original P is returned onto the stack of originals on the loading tray 510 by a discharge roller 540.

In the second discharge mode, after the image reading has been completed, the belt motor 106 is once again rotated to drive the full surface belt 536, after which the discharge motor 107 is rotated to drive the discharge roller 550, thus putting the original P onto the discharge tray 551.

The pre-cycle-end sensor 118 is an optical sensor comprised of an LED light-emitting section, and a phototransistor light-receiving section, and is arranged on the upper face of the loading tray 510. The pre-cycle-end sensor 118 detects the passage of the rear end of an original P, thus detecting when the last original in the stack of originals has passed.

In the case of a two-sided original, the original P is first led from the sheet paths a, b to the sheet path c, and is then led to the sheet path d, next the large conveying roller 537 is rotated and the position of the flapper 541 is switched over, thus passing the leading edge of the original P along the sheet path b by means of the resist roller 535, and then the original P is conveyed onto the platen glass 3 by means of the full surface belt 536 and then stopped, whereupon the original P has been turned upside down. That is, the original p is turned upside down by being passed along the sheet paths c, d and b in that order.

Note that by conveying the originals in the stack of originals one sheet at a time along the sheet paths a, b, c, d and e in that order until one cycle has been completed, the number of originals in the stack of originals can be counted.

The loading tray 510 is provided with an original-constraining plate (not shown), and due to this original-constraining plate coming into contact with the originals, skewing of the originals during conveyance is prevented; moreover, a slide volume 120 (shown in FIG. 4 but not in FIG. 3) is connected to the original-constraining plate, with this slide volume 120 detecting a voltage, the value of which depends on the position of the original-constraining plate, thus detecting the width of the originals.

Moreover, the motor clock sensor 544c measures the number of pulses as a conveyed original passes the resist sensor 116, thus detecting the length of the original in the direction of conveyance.

The size of a conveyed original P is identified from the above two detection results, and is sent to the controller 930 as original size data.

FIG. 4 is a block diagram showing the circuit configuration of the ADF 2 in the image forming apparatus shown in FIG. 1.

As shown in FIG. 4, the ADF 2 has a one-chip microcomputer (hereinafter referred to as a "CPU") 100. This CPU 100 is connected to the copier main body 1 via a communication IC 101. Moreover, a RAM 121, a ROM 102, and a nonvolatile EEPROM 103, which is a storage medium for backing up adjusted values and set values (including data necessary for maintaining proper image formation processing such as correction values for adjusting light amounts of sensors) from the controller 930, and which is free from stored data being not lost even when the power supply is turned off and which permits writing and erasure of data so long as the number of times that data is written/erased does not exceed a predetermined number, are connected to the CPU 100. The CPU 100 has input ports to which are connected the separation sensor 109, a sheet feeding cover sensor 110, the inversion entrance sensor 111, an inversion resist sensor 112, a DF opening/closing sensor 113, a conveyance clock sensor 114, the discharge clock sensor 115, the resist sensor 116, the original detecting sensor 117, the pre-cycle-end sensor 118, the inversion exit sensor 119, the slide volume 120, and the motor clock sensor 544c, with signals being inputted to the CPU 100 from these sensors.

Moreover, the CPU has an analog/digital converting element that converts the analog output voltage corresponding to the width of an original from the slide volume 120 into one of 255 digital values.

Furthermore, the CPU 100 has another analog/digital converting element that receives output voltages from the resist sensor 116, the original detecting sensor 117, the pre-cycle-end sensor 118, and the inversion exit sensor 119, and monitors the states of these optical sensors.

Furthermore, the CPU 100 has output ports to which are connected via drivers loads, namely the separating conveying motor 104, the conveying motor 105, the belt motor 106, the discharge motor 107, an electromagnetic brake 108, and the resist roller motor 544a.

The conveyance clock sensor 114 and the discharge clock sensor 115 detect the speed of rotation of the conveying motor 105 and the discharge motor 107, respectively, and are also used in detecting abnormalities in these motors.

Control data is transferred between the ADF 2 and the copier main body 1 via the communication IC 101. Data received by the ADF 2 from the copier main body 1 includes an original feed trigger, an original exchange trigger, and an original discharge trigger. Data transmitted by the ADF 2 includes operation completion signals indicative of completion of original feeding, exchange, and discharge, detected original size data, and a last original signal that gives notification of exhaustion of the stack of originals.

A control procedure (control program) for controlling the ADF 2 is stored in the ROM 102 in advance, with the inputs and outputs being controlled in accordance with this control procedure.

Figure 5:
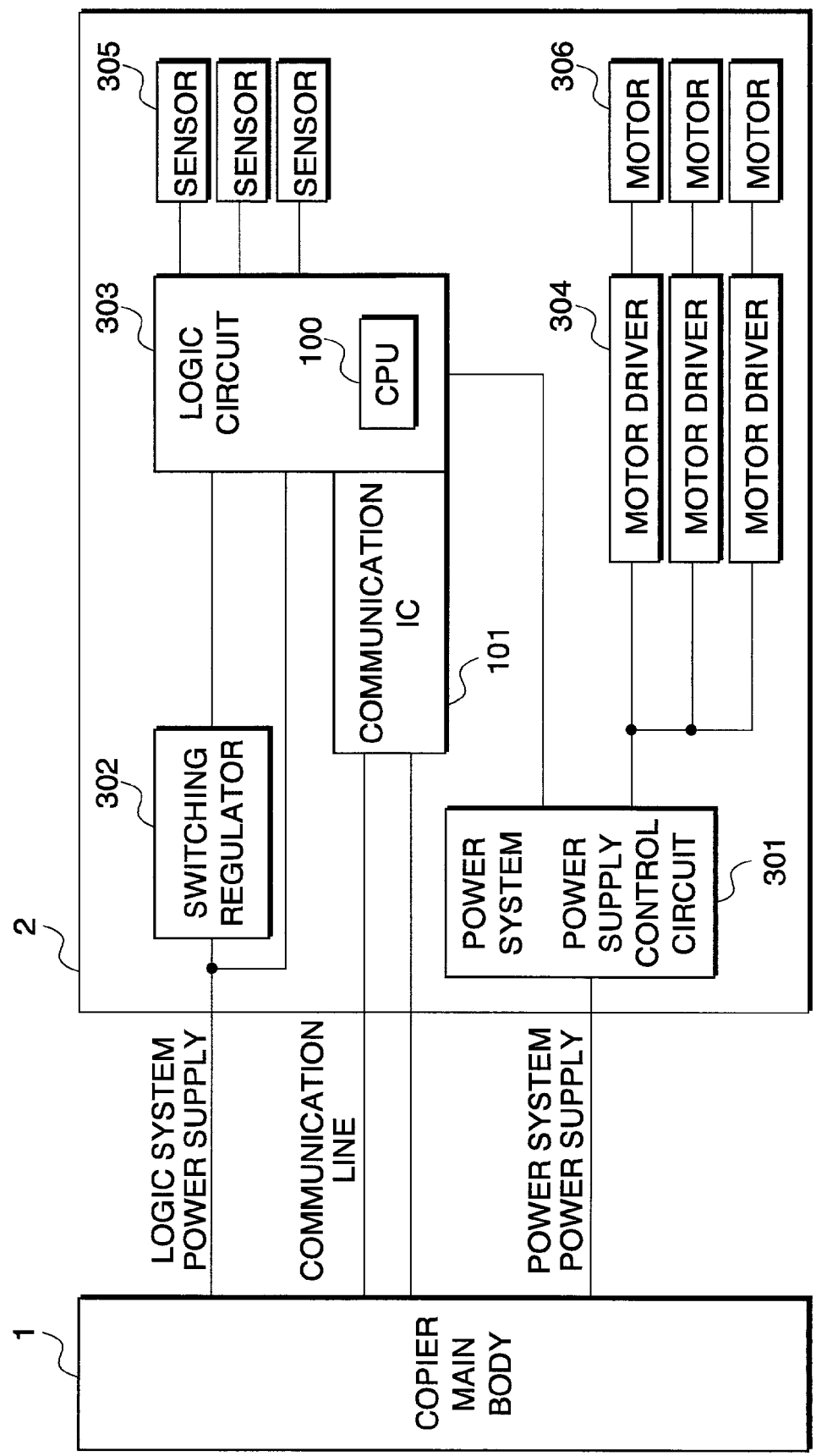
FIG. 5 is a diagram showing the circuit configuration of a power system of ADF 2 shown in FIG. 4.

FIG. 5 is a diagram showing the circuit configuration of a power system for ADF 2 shown in FIG. 4.

The ADF 2 has a switching regulator 302 and a logic circuit 303, with the logic circuit 303 containing the CPU 100.

There are two power supplies from the copier main body 1 to the ADF 2, namely a logic system power supply and a power system power supply. The logic system power supply is used for the switching regulator 302, the logic circuit 303 and sensors 305 (such as the separation sensor 109 shown in FIG. 4), while the power system power supply supplies power to motor drivers 304 via a power system power supply control circuit 301, to drive motors 306 (such as the separating conveying motor 104 in FIG. 4). The power system power supply control circuit 301 is capable of turning the power system power supply on and off in response to commands from the CPU 100.

A description will now be given of the circuit configuration of an optical sensor, taking the resist sensor 116 as an example; the other optical sensors (including the original detecting sensor 117, the pre-cycle-end sensor 118 and the inversion exit sensor 119; the fed sheet sensor 921, the post-transfer sensor 922 and the discharged sheet sensor 923 in the copier main body 1; the sheet detecting sensors along the sheet conveyance paths in the sheet processing apparatus 5; and the detecting sensors in the storage tray) have a similar or identical circuit configuration.

Figure 6:
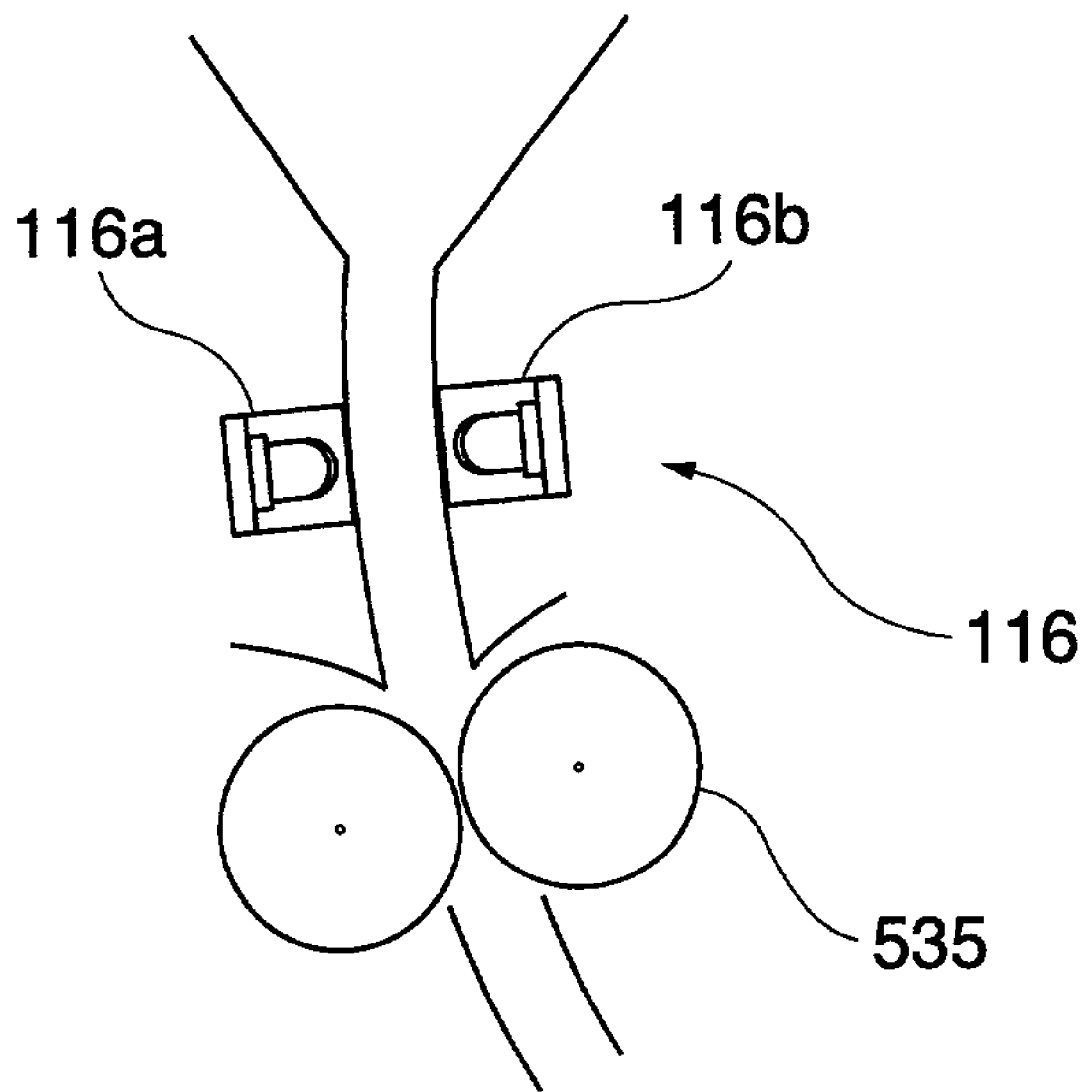
FIG. 6 is an enlarged view of a resist roller 535 and a resist sensor 116 appearing in FIG. 3.

FIG. 6 is an enlarged view of the resist roller 535 and the resist sensor 116 shown in FIG. 3.

As shown in FIG. 6, the resist sensor 116 is comprised of a light-receiving section 116a and a light-emitting section 116b.

Figure 7:
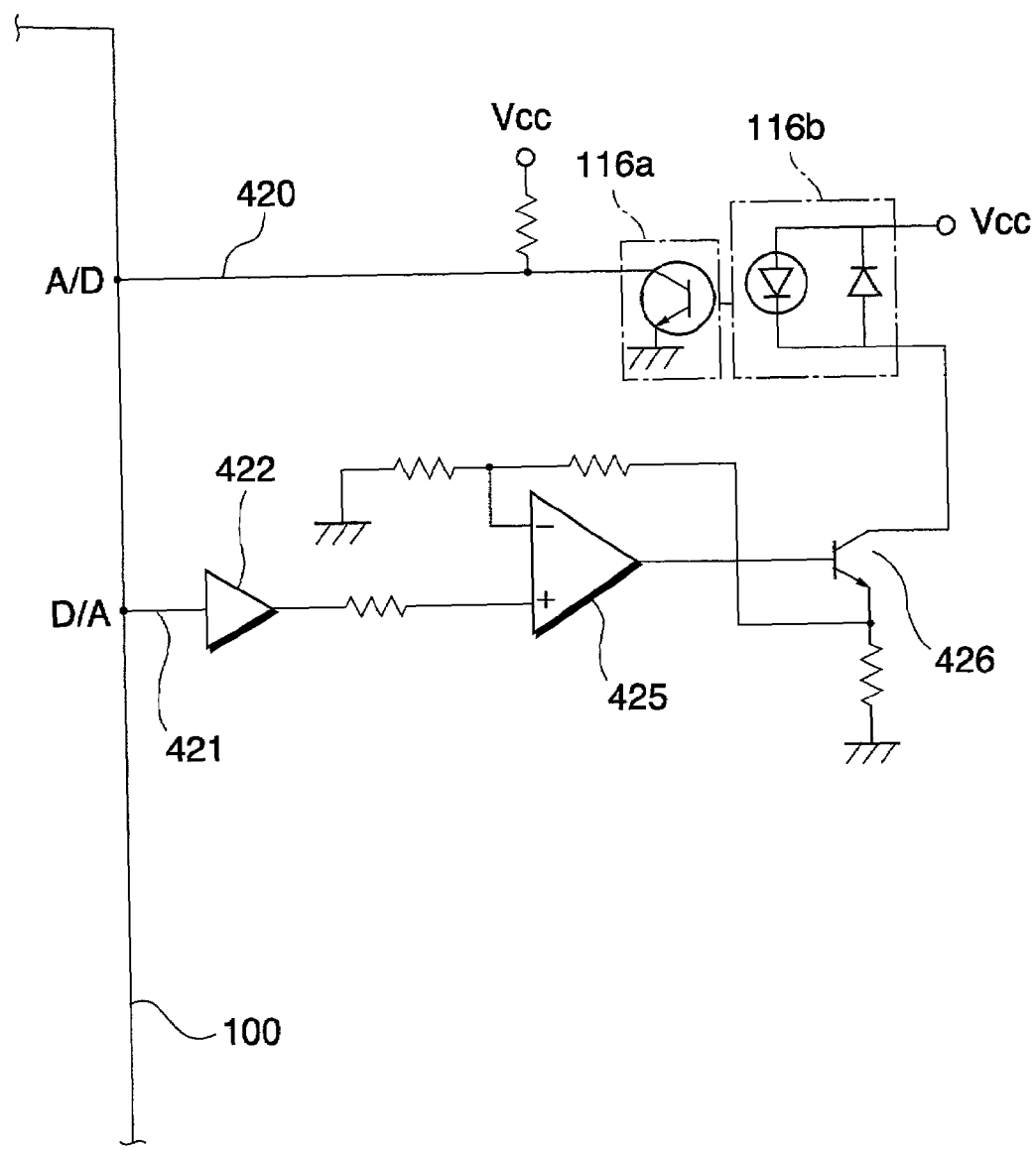
FIG. 7 is a block diagram showing the circuit configuration of the resist sensor 116 shown in FIG. 6.

FIG. 7 is a block diagram showing the circuit configuration of the resist sensor 116 shown in FIG. 6.

The resist sensor 116 is a transmission type optical sensor composed of the light-receiving section 116c and the light-emitting section 116b, and is arranged just upstream of the resist roller 535, with the light-receiving section 116a and the light-emitting section 116b facing one another with the sheet conveyance path therebetween. When an original P arrives at the resist sensor 116, infrared light from the light-emitting section 116b is blocked off, and hence the light-receiving section 116a detects that the original P has arrived. It should be noted that in place of such a transmission type optical sensor, a reflection type optical sensor may be used, in which light emitted from a light-emitting section is reflected from the original and received by a light-receiving section.

The light-emitting section 116b is an LED, of which the amount of light emitted drops as the cumulative time of light emission gets longer. Moreover, the amount of light received by the light-receiving section 116a may be less than it should be due to paper dust, dirt or the like. To maintain the amount of light received at a fixed value, the amount of light emitted is thus adjusted periodically. The CPU 100 can change the amount of light emitted by the light-emitting section 116b using a D/A converter built into the CPU 100.

There are two types of adjustment method, namely manual adjustment and automatic adjustment. In the case of manual adjustment, an adjustment mode is entered during a standby state, and adjustment is commenced by turning an adjustment switch (not shown in the drawings) on. The CPU 100 then carries out correction by changing the amount of light emitted by the light-emitting section 116b using the D/A converter until the value of an analog/digital conversion input (hereinafter referred to as the "A/D input") to the CPU 100 and a sensor signal output level 420 is a fixed value. The output value of the D/A converter shall be referred to as the correction voltage 421, and this output value is used as a correction value. Once the sequence of adjustment operations has been completed, the CPU 100 writes the correction value into the nonvolatile RAM 121, which permits electrical writing and erasure, thus holding the output value of the D/A converter at the correction value. Moreover, if the correction value has changed by at least a certain predetermined amount relative to the value before the adjustment, then the correction value is also written into the nonvolatile EEPROM 103, which permits electrical writing and erasure (i.e. the data in the EEPROM 103 is overwritten). If the change is less than the predetermined amount, then writing to the EEPROM 103 is not carried out, and hence the number of times that writing to the EEPROM 103 is carried out is kept down to the minimum necessary.

The determination as to whether or not the correction value has changed by at least the predetermined amount relative to the value before the adjustment is carried out by reading the correction value data for the current occasion stored in the RAM 121 and the correction value data already stored in the EEPROM 103 at the current point in time and comparing the two. If it is determined that the difference between the correction value data for the current occasion stored in the RAM 121 and the correction value data stored in the EEPROM 103 is equal to or more than the predetermined amount, then the correction value data for the current occasion stored in the RAM 121 is written into the EEPROM 103, overwriting the correction value data in the EEPROM 103. On the other hand, if it is determined that the difference between the correction value data for the current occasion stored in the RAM 121 and the correction value data stored in the EEPROM 103 is less than the predetermined amount, then writing of the correction value data for the current occasion stored in the RAM 121 into the EEPROM 103 is inhibited, thus leaving the correction value data already stored in the EEPROM 103 at the current point in time as it is.

This processing is carried out every time light amount adjustment is carried out. Moreover, after the light amount adjustment processing carried out on the current occasion has been completed, the correction value that was stored in the EEPROM 103 at the time of completion of the light amount adjustment processing carried out on the current occasion is adopted as the correction value until light amount adjustment processing is carried out once again.

As described above, if the correction value for the current occasion has not changed by at least a certain predetermined amount relative to the correction value already stored in the EEPROM 103, then writing of the correction value for the current occasion into the EEPROM 103 is inhibited, thus leaving the correction value already stored in the EEPROM 103 as it is, in which case this value will be continued to be adopted as the correction value.

Consequently, even if, for example, a new correction value is obtained from the D/A converter output value every time light amount adjustment processing is carried out, if there is not a large difference (i.e. a difference of a certain predetermined amount or more) between the newly obtained correction value and the correction value already stored in the EEPROM 103, then the newly obtained correction value is not adopted, but rather the correction value already stored in the EEPROM 103 is adopted.

In the case of automatic adjustment, the CPU 100 commences the adjustment operation automatically immediately after the power supply has been turned on and at predetermined time intervals during standby, with the adjustment operation being the same as in the case of manual adjustment.

The above adjustment is carried out in the same way for the other optical sensors (including the original detecting sensor 117, the pre-cycle-end sensor 118 and the inversion exit sensor 119; the fed sheet sensor 921, the post-transfer sensor 922 and the discharged sheet sensor 923 in the copier main body 1; the sheet detecting sensors along the sheet conveyance paths in the sheet processing apparatus 5; and the detecting sensors in the storage tray.

In the present embodiment, light amount adjustment processing is carried out for a plurality of sensors individually as described above, and hence the correction value for each sensor is stored in the EEPROM 103 and managed separately.

Figure 8:
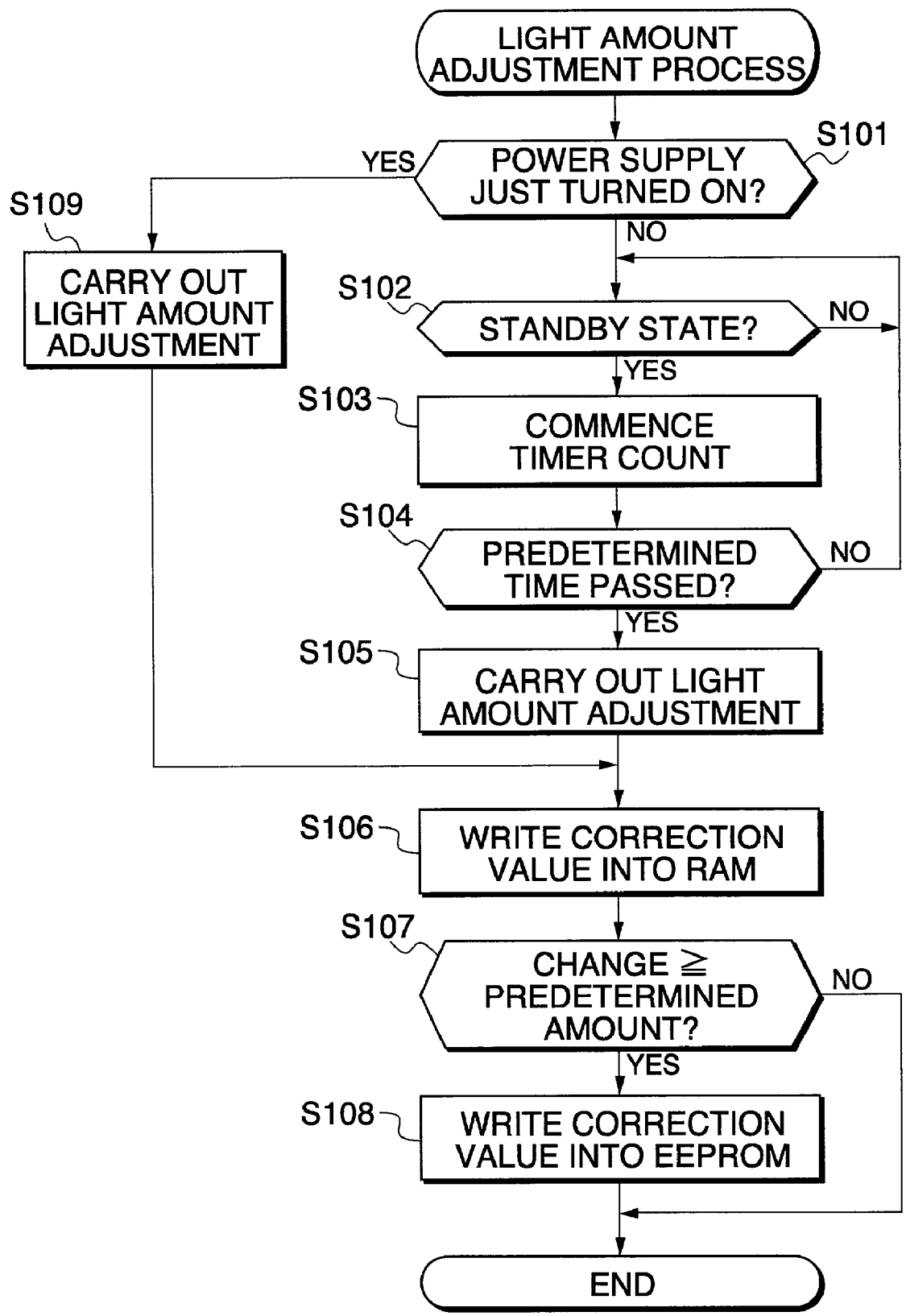
FIG. 8 is a flowchart of an optical sensor light amount adjustment process carried out by the original conveying apparatus according to the embodiment.

FIG. 8 is a flowchart showing the optical sensor light amount adjustment process carried out by the original conveying apparatus according to the present embodiment.

The sensors for which this processing is carried out are optical sensors, and include the resist sensor 116, the original detecting sensor 117, the pre-cycle-end sensor 118, and the inversion exit sensor 119. Moreover, as described above, in the present embodiment, the process shown in the flowchart in FIG. 8 can be carried out not only with these optical sensors that are provided in the original conveying apparatus, but also optical sensors provided in the copier main body 1 such as the fed sheet sensor 921, the post-transfer sensor 922 and the discharged sheet sensor 923, sheet-detecting optical sensors provided in the sheet processing apparatus 5, and so on. The controller 930 carries out the process shown in FIG. 8 for each of these sensors individually.

As shown in FIG. 8, it is first determined whether or not the power supply to the ADF 2 has just been turned on (step S101). If the power supply has just been turned on, then light amount adjustment for the light-emitting section 116b of the optical sensor is carried out (step S109) (adjustment means), before the process proceeds to step S106. If it is determined from the step S101 determination that a certain amount of time has passed since the power supply was turned on, then waiting is carried out until the ADF 2 moves into a standby state ("YES" at step S102), and then a timer count is commenced (step S103), and after a predetermined time period has passed after commencement of the count ("YES" at step S104), light amount adjustment for the light-emitting section 116b of the optical sensor is carried out (step S105) (adjustment means), before the process proceeds to step S106.

At step S106, the correction value for the light amount of the light-emitting section 116b of the optical sensor obtained through the processing at step S105 is written into the RAM 121 for temporary storage (step S106) (writing means), and then it is determined whether or not this correction value (i.e. the correction value obtained through the adjustment processing on the current occasion and stored in the RAM 121) has changed by a certain predetermined amount or more relative to the correction value before the adjustment (i.e. the correction value already stored in the EEPROM 103 at the current point in time) (step S107). If the result of the determination at step S107 is that the correction value has changed by the predetermined amount or more, then the correction value obtained through the adjustment processing on the current occasion and stored in the RAM 121 is written into the EEPROM 103 (step S108) (writing means), and then the processing is terminated. On the other hand, if the result of the determination at step S107 is that the correction value has not changed by the predetermined amount or more, then the processing is terminated without writing the correction value for the current occasion into the EEPROM 103.

According to the process shown in FIG. 8, if the correction value for the light amount of the light-emitting section 116b of the optical sensor has changed by at least a certain predetermined amount relative to the correction value before the adjustment ("YES" at step S107), then writing of the correction value to the EEPROM 103 is carried out (step S108), whereas if the correction value has not changed by at least this predetermined amount ("NO" at step S107), then writing of the correction value to the EEPROM 103 is not carried out; as a result, the number of times that writing to the EEPROM 103 is carried out can be reduced. Moreover, adjustment of the light amount of the light-emitting section 116b of the optical sensor (step S105 or S109) is carried out immediately after the power supply to the original conveying apparatus (the ADF 2) has been turned on ("YES" at step S101) and at predetermined time intervals after the original conveying apparatus has moved into a standby state ("YES" at step S102); as a result, adjustment of the amount of light emitted from the light-emitting section 116b can be carried out when this light amount is stable.

It should be noted that when carrying out the process shown in FIG. 8 for a sensor of the copier main body 1 (for example, the fed sheet sensor 921, the post-transfer sensor 922 or the discharged sheet sensor 923), in the above description of the processing, in the steps in which "ADF 2" is written (step S101 etc.), "ADF 2" should be changed to "copier main body 1". Moreover, when carrying out the process shown in FIG. 8 for a sensor of the sheet processing apparatus 5, in the above description of the processing, in the steps in which "ADF 2" is written (step S101 etc.), "ADF 2" should be changed to "sheet processing apparatus 5".

As described above, the process shown in FIG. 8 can also be implemented for the sensors of the copier main body 1 and the sheet processing apparatus 5.

It also goes without saying that the objects of the present invention can also be achieved by supplying a system or apparatus with a storage medium storing a program code of a software program that can realize the functions of the embodiment described above (the process shown in the flowchart of FIG. 8, etc.), and then causing a computer (or CPU, MPU or the like) of the system or apparatus to read and execute the program code stored on the storage medium.

In this case, the program code itself read from the storage medium realizes the functions of the embodiment described above, and thus the storage medium storing the program code constitutes the present invention.

Examples of the storage medium storing such a program code include a floppy disk, a hard disk, an optical disk, a magnetic-optical disk, a CD-ROM, a CD-R, a magnetic tape, a nonvolatile memory card, and a ROM.

Moreover, it also goes without saying that the functions of the embodiment described above may be realized by executing the supplied program code by the computer, but also by causing an operating system (OS) running on the computer to perform part or all of actual processing operations according to instructions of the program code.

Furthermore, it also goes without saying that the the functions of the above described embodiment may be realized by writing the program code read from the storage medium into a memory provided on a function expansion board inserted into the computer or in a function expansion unit connected to the computer, and then causing a CPU or the like provided in the function expansion board or in the function expansion unit to perform part or all of the actual processing operations.

Furthermore, it is also possible for the above system or apparatus to obtain the effects of the present invention by downloading a program expressed as software for attaining the present invention from a database on a network using a communication program and then reading the downloaded program.

As described in detail above, according to the present embodiment, if the correction value for the amount of light emitted by the light-emitting section of an optical sensor has not changed by at least a certain predetermined amount relative to the value before adjustment, then writing of the correction value is carried out only to a volatile storage medium and is not carried out to a nonvolatile storage medium, and hence the number of times that writing to the nonvolatile storage medium is carried out can be reduced, and as a result, even if adjustment of the amount of light emitted by the optical sensor is carried out frequently, the number of times that writing is carried out to the nonvolatile storage medium storing the correction value can be prevented from exceeding a limit on this number of times.

As described above, according to the present embodiment, the number of times that data is written to a nonvolatile storage medium that is capable of storing data such as correction values used in correction processing for maintaining proper output processing but for which the number of times that data can be written is limited is reduced as far as possible, thus making it possible to lengthen the lifetime of the storage medium and eliminate the occurrence of inconvenient situations such as it being impossible to maintain proper output processing.

Moreover, according to the present embodiment, adjustment of the amount of light emitted by the light-emitting section is carried out immediately after the power supply to the original conveying apparatus (or the main body of the image forming apparatus in the case of adjusting the light amount of the fed sheet sensor 921, the post-transfer sensor 922 or the discharged sheet sensor 923, or the main body of the sheet processing apparatus 5 in the case of adjusting the light amount of a sensor possessed by the sheet processing apparatus 5) has been turned on and after a predetermined time period has passed after the apparatus in question has moved into standby mode, and thus adjustment of the amount of light emitted by the light-emitting section can be carried out when this light amount is stable.

What is claimed is:

1. An original conveying apparatus comprising:
   conveying means for conveying an original to an image reading section of an image forming apparatus;
   original detecting means comprising a light-emitting section, and a light-receiving section;
   adjustment means for adjusting a light amount from said light-emitting section;
   volatile storage means which permits electrical writing and erasure, for storing a correction value of the light amount adjusted by said adjustment means;
   nonvolatile storage means which permits electrical writing and erasure, for storing the correction value; and
   writing means for carrying out writing of the correction value only to said volatile storage means and not to said nonvolatile storage means when the correction value has not changed by at least a predetermined amount relative to a correction value before adjustment by said adjustment means,
   wherein adjustment of the light amount from said light-emitting section by said adjustment means is carried out after a predetermined time period has passed after the original conveying apparatus has moved into a standby mode.

2. An original conveying apparatus as claimed in claim 1, wherein adjustment of the light amount from said light-emitting section by said adjustment means is also carried out immediately after a power supply to said original conveying apparatus has been turned on.

3. An original conveying apparatus as claimed in claim 1, wherein said volatile storage means comprises a RAM, and said nonvolatile storage means comprises an EEPROM.

4. An image forming apparatus having an original conveying apparatus as claimed in claim 1, for forming an image on a recording sheet based on an image on the original.

5. A method of adjusting a light amount of a light-emitting section of an original conveying apparatus comprising conveying means for conveying an original to an image reading section of an image forming apparatus, original detecting means comprising a light-emitting section, and a light-receiving section, adjustment means for adjusting a light amount from said light-emitting section, volatile storage means which permits electrical writing and erasure, for storing a correction value of the light amount adjusted by said adjustment means, and nonvolatile storage means which permits electrical writing and erasure, for storing the correction value, the method comprising the step of:
   carrying out writing of the correction value only to said volatile storage means and not to said nonvolatile storage means when the correction value has not changed by at least a predetermined amount relative to a correction value before adjustment by said adjustment means, wherein adjustment of the light amount from said light-emitting section by said adjustment means is carried out after a predetermined time period has passed after the original conveying apparatus has moved into a standby mode.

6. A method as claimed in claim 5, wherein adjustment of the tight amount from said light-emitting section by said adjustment means is also carried out immediately after a power supply to said original conveying apparatus has been turned on.

7. A storage control device for controlling writing data relating to a correction value of a light amount from a light-emitting section of an image forming apparatus to a volatile first storage device and a nonvolatile second storage device of said image forming apparatus, wherein said light amount has been adjusted by adjustment means of said image forming apparatus, the storage control device comprising:

storage control means for inhibiting writing to said second storage device of the data relating to the correction value adjusted by said adjustment means as a result of adjustment of the light amount from said light-emitting section carried out by said adjustment means, when the data relating to the correction value adjusted by said adjustment means has not changed by at least a predetermined amount relative to data relating to a correction value already stored in said second storage devices, wherein adjustment of the light amount from said light-emitting section by said adjustment means is carried out after a predetermined time period has passed after the image forming apparatus has moved into a standby mode.

8. A storage control device as claimed in claim 7, wherein said storage control means permits writing to said first storage device of the data relating to the correction value adjusted by said adjustment means each time adjustment of the light amount from said light-emitting section is carried out by said adjustment means.

9. A storage control device as claimed in claim 8, wherein said storage control means includes comparing means being responsive to adjustment of the light amount from said light-emitting section having been carried out by said adjustment means, for comparing the data relating to the correction value that has been adjusted by said adjustment means and written to said first storage device with the data relating to the correction value already written to said second storage device, and wherein said storage control means determines whether or not to inhibit writing to said second storage device of the data relating to the correction value adjusted by said adjustment means based on a comparison result from said comparing means.

10. A storage control device as claimed in claim 9, wherein said storage control means is responsive to a determination from the comparison result by said comparing means that the data relating to the correction value that has been adjusted by said adjustment means and written to said first storage device has changed by at least the predetermined amount relative to the data relating to the correction value already written to said second storage device, for permitting writing to said second storage device of the data relating to the correction value adjusted by said adjustment means.

11. A storage control device as claimed in claim 7, wherein said image forming apparatus includes an original conveying apparatus, and a sensor for detecting an original provided in said original conveying apparatus, said sensor having said light-emitting section, and wherein said adjustment means adjusts a light amount from said light-emitting section of said sensor.

12. A storage control device as claimed in claim 11, wherein adjustment of the light amount from said light-emitting section by said adjustment means is carried out immediately after a power supply to said original conveying apparatus has been turned on and after a predetermined time period has passed after said original conveying apparatus moved into a standby mode.

13. A storage control device as claimed in claim 7, wherein said image forming apparatus includes an image forming section main body, and a sensor for detecting a sheet provided in said image forming section main body, said sensor having said light-emitting section, and wherein said adjustment means adjusts a light amount from said light-emitting section of said sensor.

14. A storage control device as claimed in claim 13, wherein adjustment of the light amount from said light-emitting section by said adjustment means is carried out immediately after a power supply to said image forming section main body has been turned on and after a predetermined time period has passed after said image forming section main body moved into a standby mode.

15. A storage control device as claimed in claim 7, wherein said image forming apparatus includes a sheet processing device, and a sensor for detecting a sheet provided in said sheet processing device, said sensor having said light-emitting section, and wherein said adjustment means adjusts a light amount from said light-emitting section of said sensor.

16. A storage control device as claimed in claim 15, wherein adjustment of the light amount from said light-emitting section by said adjustment means is carried out immediately after a power supply to said sheet processing device has been turned on and after a predetermined time period has passed after said sheet processing device moved into a standby mode.

17. A storage control device as claimed in claim 7, wherein said first storage device includes a RAM, and said second storage device includes an EEPROM.

18. A storage control method of controlling writing data relating to a correction value of a light amount from a light-emitting section of an image forming apparatus to a volatile first storage device and a nonvolatile second storage device of said image forming apparatus wherein said light amount has been adjusted by adjustment means of said image forming apparatus, the storage control method comprising:

a storage control step of inhibiting writing to said second storage device of the data relating to the correction value adjusted by said adjustment means as a result of adjustment of the light amount from said light-emitting section carried out by said adjustment means, when the data relating to the correction value adjusted by said adjustment means has not changed by at least a predetermined amount relative to data relating to a correction value already stored in said second storage devices, wherein adjustment of the light amount from said light-emitting section by said adjustment means is carried out after a predetermined time period has passed after the image forming apparatus has moved into a standby mode.

19. A computer-readable storage medium storing a program for causing a storage control device that controls writing data relating to a correction value of a light amount from a light-emitting section of an image forming apparatus to a volatile first storage device and a nonvolatile second storage device of said image forming apparatus, wherein said light amount has been adjusted by adjustment means of said image forming apparatus, the program comprising:

a storage control step of inhibiting writing to said second storage device of the data relating to the correction value adjusted by said adjustment means as a result of adjustment of the light amount from said light-emitting section carried out by said adjustment means, when the data relating to the correction value adjusted by said adjustment means has not changed by at least a predetermined amount relative to data relating to a correction value already stored in said second storage device, wherein adjustment of the light amount from said light-emitting section by said adjustment means is carried out after a predetermined time period has passed after the image forming a apparatus has moved into a standby mode.

20. An original conveying apparatus comprising:

a conveying device that conveys an original to an image reading section of an image forming apparatus;

an original detecting sensor comprising a light-emitting section, and a light-receiving section;

an adjustment device that adjusts a light amount from said light-emitting section;

a volatile storage device that permits electrical writing and erasure, for storing a correction value of the light amount adjusted by said adjustment device;

a nonvolatile storage device that permits electrical writing and erasure, for storing the correction value; and a writing device that carries out writing of the correction value only to said volatile storage device and not to said nonvolatile storage device when the correction value has not changed by at least a predetermined amount relative to a correction value before adjustment by said adjustment device, wherein said adjustment device does not adopt a new correction value obtained every time adjustment of the light amount is carried out, but adopts the correction value stored in said nonvolatile storage device to carry out the adjustment of the light amount when the new correction value obtained has not changed by at least a predetermined amount relative to the correction value before adjustment.

* * * * *